(12) United States Patent
Sato

(10) Patent No.: US 7,951,936 B2
(45) Date of Patent: May 31, 2011

(54) CROSSLINKED POLYSACCHARIDE SPONGE

(75) Inventor: Tomoya Sato, Tokorozawa (JP)

(73) Assignee: Seikagaku Corporation, Tokyo (JP)

( * ) Notice: Subject to any disclaimer, the term of this patent is extended or adjusted under 35 U.S.C. 154(b) by 13 days.

(21) Appl. No.: 11/976,810

(22) Filed: Oct. 29, 2007

(65) Prior Publication Data

US 2008/0071001 A1 Mar. 20, 2008

Related U.S. Application Data

(62) Division of application No. 10/470,349, filed as application No. PCT/JP02/00720 on Jan. 30, 2002.

(30) Foreign Application Priority Data

Jan. 31, 2001 (JP) ................. 2001-024159

(51) Int. Cl.
*C07H 1/00* (2006.01)
*C07H 5/06* (2006.01)
*C08B 11/12* (2006.01)
*A61K 31/715* (2006.01)
*A61K 31/727* (2006.01)
*A61K 31/70* (2006.01)
*A01N 43/04* (2006.01)

(52) U.S. Cl. ........ 536/124; 536/55.2; 536/55.3; 536/98; 514/54; 514/53; 514/55; 514/56; 514/57; 514/62

(58) Field of Classification Search .................. 536/124, 536/55.2, 55.3, 98; 514/54, 53, 55, 56, 57, 514/62

See application file for complete search history.

(56) References Cited

U.S. PATENT DOCUMENTS

| | | | |
|---|---|---|---|
| 5,035,893 A | 7/1991 | Shioya et al. | |
| 5,462,976 A | 10/1995 | Matsuda et al. | |
| 5,595,621 A | 1/1997 | Light et al. | |
| 5,789,462 A | 8/1998 | Motani et al. | |
| 6,334,968 B1 | 1/2002 | Shapiro et al. | |
| 2003/0073663 A1 * | 4/2003 | Wiseman et al. | 514/54 |

FOREIGN PATENT DOCUMENTS

| | | | |
|---|---|---|---|
| JP | 05085913 A | | 4/1993 |
| JP | 11322807 A | * | 11/1999 |
| WO | WO 96/03440 A1 | | 2/1996 |

* cited by examiner

*Primary Examiner* — Shaojia Anna Jiang
*Assistant Examiner* — Everett White
(74) *Attorney, Agent, or Firm* — Nixon & Vanderhye P.C.

(57) ABSTRACT

A process for producing a polysaccharide sponge comprises the steps of (A) freezing a photoreactive polysaccharide solution, and (B) irradiating the frozen photoreactive polysaccharide solution with light to crosslink the photoreactive polysaccharide, thereby obtaining the polysaccharide sponge. The process includes simplified steps requiring no removal of solvent, and has such an advantage that impurities are easily removed therefrom.

2 Claims, 6 Drawing Sheets

CROSSLINKED POLYSACCHARIDE SPONGE

This application is a divisional of application Ser. No. 10/470,349 filed Oct. 15, 2003, which in turn is the US national phase of international application PCT/JP02/00720 filed 30 Jan. 2002, which designated the US, which claims priority of Japanese application 2001-24159 filed Jan. 31, 2001.

TECHNICAL FIELD

The present invention relates to a polysaccharide sponge and a process for producing the same. The "sponge" used herein means a porous material having closed cells or open or interconnected cells.

BACKGROUND ART

Various attempts have been performed for applying polymeric sponges to living organism because of a good water absorption property thereof. Among them, sponges made of biodegradable polysaccharide are useful owing to a high affinity to the living organism, i.e., a good biocompatibility. However, many polysaccharides having such a good biocompatibility have a hydrophilicity and, therefore, tend to be easily decomposed in vivo. For this reason, polysaccharides used for the sponges are frequently insolubilized or converted into high-molecular ones in order to retard or prevent the degradation of the sponges in vivo, thereby obtaining biocompatible sponges.

For example, in Japanese Patent Application Laid-Open (KOKAI) No. 10-226732, there has been proposed the method for producing a polysaccharide sponge by freezing a polysaccharide solution, immersing the frozen solution in a water-miscible organic solvent containing a crosslinking agent to crosslink the polysaccharide, and then drying the crosslinked product to obtain a sponge.

However, in the above-mentioned method, since the obtained sponge still contains the unreacted crosslinking agent, it is required to subject the sponge to post-washing treatment. However, it may, be extremely difficult to wash a porous material such as sponges.

SUMMARY OF THE INVENTION

Figure 1:
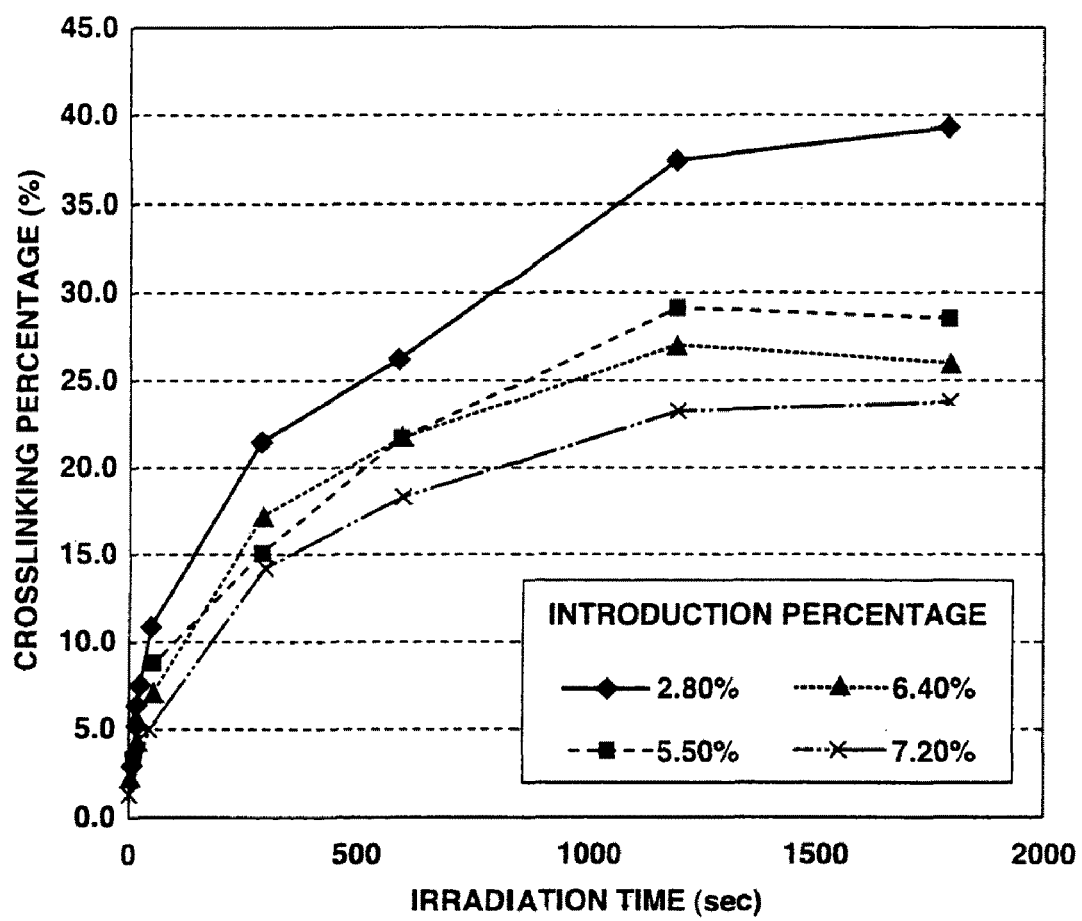
FIG. 1 is a graph showing a relationship between a photoreactive crosslinking group introduction percentage, an irradiation time and a crosslinking percentage.

The present invention has been attained to solve the above problems. An object of the present invention is to provide a polysaccharide sponge from which impurities can be easily removed.

That is, to accomplish the aim, in an aspect of the present invention, there are mainly provided a polysaccharide sponge comprising a crosslinked polysaccharide obtained by crosslinking a photoreactive polysaccharide, and having not less than 760 pores per an unit area (1 cm$^2$) among which not less than 50% of said pores have a pore diameter of 10 to 50 µm, and a process for producing the same.

The present invention will be described in detail below.

1. Polysaccharide Sponge of the Present Invention:

The polysaccharide sponge of the present invention has not less than 760 pores per an unit area (1 cm$^2$) among which not less than 50% of the pores have a pore diameter of 10 to 50 µm, and is composed of a crosslinked polysaccharide obtained by crosslinking a photoreactive polysaccharide.

The polysaccharide sponge of the present invention is a porous material. The number of the pores formed in the polysaccharide sponge of the present invention is usually not less than 760, preferably not less than 1,000 per an unit area (1 cm$^2$) from the viewpoints of good water absorption and discharge efficiencies (namely, the above number of the pores corresponds to usually not less than 30, preferably not less than 40 per 160×246=39,360 µm$^2$ which is a photographed area of the electron micrograph shown in below-mentioned Examples). These pores preferably have a pore diameter within a predetermined range in the consideration of uniform structure of the obtained sponge. More specifically, it is preferred that not less than 50% of the pores present in the above unit area have a pore diameter of 10 to 50 µm; it is more preferred that not less than 60% of the pores have a pore diameter of 10 to 50 µm; and it is still more preferred that not less than 70% of the pores have a pore diameter of 10 to 50 µm. The number and diameter of the pores per the unit area (1 cm$^2$) can be measured from the electron micrograph of the obtained polysaccharide sponge, etc.

The polysaccharide sponge of the present invention preferably maintains a constant shape even in a water-absorbed state. For example, when immersed at 24° C. in a largely excessive amount of water, the polysaccharide sponge of the present invention preferably still maintains its spongy structure even after the elapse of usually at least 1 hour, preferably 3 hours, more preferably 24 hours and still more preferably 48 hours.

Further, the polysaccharide sponge of the present invention has the following water content. That is, the water content calculated from the following formula is usually not less than 70%, preferably not less than 75%, more preferably not less than 80%.

$$\{(Ww-Wd)/Ww\} \times 100$$

(wherein Ww is a weight of the sponge when immersed in an injection water for 5 seconds; and Wd is a weight of the sponge after completely removing water from the water-immersed sponge using a filter paper.)

The polysaccharide forming the polysaccharide sponge of the present invention is not particularly restricted as long as the polysaccharide exhibits a good affinity to living organism, and preferably includes those having a high hydrophilicity as well as a good affinity to living organism. Meanwhile, the "affinity to living organism" means such a condition that the use of the polysaccharide induces neither rejection symptoms nor antigenicity of the living organism. Specific examples of the suitable polysaccharide may include glucosaminoglycans such as hyaluronic acid, chondroitin, chondroitin sulfate, dermatan sulfate, heparin, keratan sulfate, heparan sulfate or the like; polyuronic acids such as alginic acid, pectic acid or the like; mannans; starches; agars; gum arabic; tragacanth gum; cellulose or hydrophilic derivatives thereof such as carboxymethyl cellulose, hydroxyethyl cellulose or the like; polyamino polysaccharides such as chitin, chitosan or the like of these polysaccharides, from the standpoints of high shape stability of the obtained polysaccharide sponge, especially preferred are hyaluronic acid, chondroitin sulfate, heparin, heparan sulfate, keratan sulfate, chitin, chitosan, alginic acid and carboxymethyl cellulose.

The molecular weight (weight-average molecular weight) of the polysaccharide is as follows. The polysaccharides other than hyaluronic acid have a molecular weight of usually 2,000 to 3,000,000, preferably 3,000 to 2,700,000, more preferably 4,000 to 2,500,000. The hyaluronic acid has a molecular weight of usually 200,000 to 3,000,000, preferably 300,000 to 2,000,000, more preferably 400,000 to 1,200,000.

The crosslinked polysaccharide used in the polysaccharide sponge of the present invention is a polysaccharide obtained by crosslinking a photoreactive polysaccharide by irradiating light thereto. The "photoreactive polysaccharide" means a polysaccharide derivative obtained by chemically bonding a photo-crosslinking group to the above polysaccharide. The photo-crosslinking group is a crosslinking group having a photoreactive residue. As the photoreactive residue, there may be used residues of any suitable compounds without any particular limitation as long as the residues undergo photo-dimerization reaction or photopolymerization reaction by irradiating light thereto. In the present invention, the photoreactive residue may be suitably selected so as not to cause breakage of glycoside bonds of the polysaccharide when the photo-crosslinking group is introduced thereinto.

Examples of the photoreactive residues may include cinnamic acid, substituted cinnamic acids such as aminocinnamic acid (i.e., cinnamic acid derivative obtained by substituting any of hydrogen atoms bonded to the benzene ring with amino group, preferably p-aminocinnamic acid), acrylic acid, maleic acid, fumaric acid, furyl acrylic acid, thiophene acrylic acid, cinnamylidene acetate, sorbic acid, thymine, cumarin or the like. Of these photoreactive residues, preferred are those having a vinylene group capable of forming a cyclobutane ring by irradiating light thereto, and more preferred are cinnamic acid and substituted cinnamic acids, especially aminocinnamic acid, in the consideration of good photoreactivity and high safety to living organism. Also, in order to minimize adverse influence of the photoreactive residue on the polysaccharide, the photoreactive residue is preferably bonded to the polysaccharide through a spacer. Therefore, most preferred photo-crosslinking groups are derivatives of cinnamic acid or substituted cinnamic acids to which the spacer is bonded.

Examples of the most preferred photo-crosslinking groups may include cinnamic acid aminoalkyl ester derivatives obtained by ester-bonding amino alcohol ($H_2N$—$(CH_2)_n$—OH, etc. wherein n is 1 to 18, or $H_2N$—$(CH_2$—$O)_m$—$CH_2$—OH wherein m is 1 to 9) to carboxyl group of cinnamic acid, such as Ph-CH=CH—CO—O—$(CH_2)_n$—$NH_2$, Ph-CH=CH—CO—O—$CH_2$—$(CH_2$—$O)_m$—$NH_2$, etc., wherein n and m are the same as defined above, and Ph is phenyl; derivatives obtained by introducing diamine ($H_2N$—$(CH_2)_l$—$NH_2$ wherein l is 1 to 10) or diol (HO—$(CH_2)_k$—OH wherein k is 1 to 10) into carboxyl group of cinnamic acid, such as Ph-CH=CH—CO—NH—$(CH_2)_l$—$NH_2$, Ph-CH=CH—CO—O—$(CH_2)_k$—OH, etc., wherein l, k and Ph are the same as defined above; derivatives obtained by introducing amino acid (HOOC—$(CHR)_j$—$NH_2$ wherein j is 1 to 10 and R's are independently a side chain of amino acid), peptide, etc. into substituted cinnamic acid (aminocinnamic acid), such as HOOC—CH=CH-Ph-NH—CO—$(CHR)_j$—NH and HOOC—CH=CH-Ph-NH-(peptide) wherein R, j and Ph are the same as defined above; or the like. Of these photo-crosslinking groups, preferred are cinnamic acid aminoalkyl ester derivatives obtained by introducing amino alcohol into carboxyl group of cinnamic acid so as to form an ester bond therebetween. In the above general formulae representing the amino alcohol introduced, n is preferably 1 to 18, more preferably 3 to 6, still more preferably 3 to 4. In particular, when the cinnamic acid aminoalkyl ester is used as the photo-crosslinking group, as the polysaccharide, there may be suitably used carboxyl-containing polysaccharides, more preferably uronic acid-containing polysaccharides, still more preferably hyaluronic acid. In this case, the photo-crosslinking group is bonded to the polysaccharide by forming an amide bond between the amino residue of the aminoalkyl group and the carboxyl group of the polysaccharide. Such photoreactive polysaccharides can be produced by known methods described, for example, in Japanese Patent Application Laid-Open (KOKAI) Nos. 6-73102, 8-143604 and 9-87236, WO97/18244, etc.

The polysaccharide sponge of the present invention can be produced by the following production processes (1) and (2).

Production process (1): Process comprising the step (A) of freezing a photoreactive polysaccharide solution; and the step (B) of irradiating the obtained frozen photoreactive polysaccharide solution with light to crosslink the photoreactive polysaccharide, thereby obtaining the polysaccharide sponge.

Production process (2): Process comprising the step (C) of freeze-drying a photoreactive polysaccharide solution; and the step (D) of irradiating the obtained freeze-dried product with light to crosslink the photoreactive polysaccharide, thereby obtaining the polysaccharide sponge.

The respective production processes (1) and (2) are more specifically explained below.

2. Production Process (1)

(1) Step (A):

The step (A) is a step of freezing a solution containing a photoreactive polysaccharide. The concentration of the photoreactive polysaccharide contained in the solution to be frozen may be appropriately selected according to the relationship between molecular weight of the polysaccharide and the introduction percentage of the photo-crosslinking group into the polysaccharide, and is usually in the range of 0.1 to 10% by weight. For example, in the case where the photo-crosslinking group is introduced into hyaluronic acid having a weight-average molecular weight of 400,000 to 1,200,000 at an introduction percentage of 1.0 to 8.0% by weight, the concentration of the photoreactive polysaccharide contained in the solution is in the range of 0.5 to 6.0% by weight.

Meanwhile, the introduction percentage (degree of substitution) represents the value expressed by percentage showing a proportion of "moles of the photo-crosslinking group introduced" to "moles of functional groups of the polysaccharide into which the photo-crosslinking group can be introduced". In addition, in this case, the functional groups of the polysaccharide into which the photo-crosslinking group can be introduced, are varied depending upon kinds of the photo-crosslinking group and spacer used. In the case where a carboxyl group of the photo-crosslinking group or spacer is used for bonding to the polysaccharide, as the functional group of the polysaccharide, there may be exemplified an amino group and a hydroxy group. Also, when an amino group of the photo-crosslinking group or spacer is used for bonding to the polysaccharide, as the functional group of the polysaccharide, there may be exemplified a carboxyl group.

The solvent used for producing the above photoreactive polysaccharide solution is not particularly restricted as long as the obtained solution can be frozen while keeping the photoreactive polysaccharide therein in a dissolved or suspended state. Examples of such a solvent may include water, mixtures of water with an organic solvent such as dimethylformamide (DMF), dimethylsulfoxide (DMSO), hexamethylphosphoramide (HMPA), pyridine and dioxane, organic solvents or the like. In particular, in order to adjust the pore diameter of the obtained polysaccharide sponge to the preferred range of from 10 to 50 μm, the use of water-containing solvents such as water and mixtures of water with organic solvents is preferred. Therefore, the water-containing solvent such as phosphoric acid-buffered physiological salt solution, distilled water, injection water or the like can be used in the step (A) to prepare the photoreactive polysaccharide solution.

In the present invention, undesirable substances other than the photoreactive polysaccharide, solvent and organic acid salts in the buffer solution, which should be prevented from remaining in the finally obtained polysaccharide sponge, for example, reaction reagents containing unreacted photo-crosslinking group, impurities and foreign materials, are previously removed from the solution to enhance a purity of the obtained polysaccharide sponge to such an extent that the sponge can be used in medical applications, e.g., as medical equipment. The removal of impurities and foreign materials from the solution can be performed by known methods such as dialysis, filtration and centrifugal separation. The photoreactive polysaccharide is usually soluble in a mixed solution of water and a water-soluble organic solvent and, therefore, can be dissolved therein to form a polysaccharide solution. Accordingly, when the polysaccharide solution is subjected to removal procedure for impurities and foreign materials, it is possible to more easily remove residual reaction regents that are unreacted with the polysaccharide from the solution. In particular, upon production of a porous sponge that is not readily washable, it is especially useful to obtain a high-purity photoreactive polysaccharide as the raw material.

Then, the photoreactive polysaccharide solution is frozen into a shape required in aimed applications of the polysaccharide sponge, whereby the final shape of the sponge obtained upon the crosslinking reaction by light irradiation is defined. On the other hand, in the case where the group capable of causing a crosslinking reaction by absorption of ultraviolet light, for example, cinnamic acid or the like, is used as the photoreactive residue, the solution is preferably frozen in view of an ultraviolet transmittance of the frozen product such that ultraviolet light is transmitted by a distance (depth) of not more than 1 cm into the frozen product.

The freezing conditions are not particularly restricted, and the solution may be frozen under ordinary conditions. For example, the photoreactive polysaccharide solution may be filled in a container defining a shape of the polysaccharide sponge and then rapidly frozen in ultra-low temperature atmosphere such as liquefied nitrogen. Alternatively, the photoreactive polysaccharide solution may be relatively slowly frozen in a refrigerator capable of freezing the solution. Meanwhile, when the solution is irradiated with light from external light source through an outer wall of the container defining the shape thereof, it is required that the container is made of a material incapable of absorbing light having a wavelength required for crosslinking reaction of the photo-crosslinking group and capable of transmitting such a light therethrough. When the irradiated light is an ultraviolet light, as the material, there may be used polymer compounds having a low ultraviolet absorbance such as polypropylene, glass, especially quartz glass and hard glass, or the like.

(2) Step (B)

In the step (B), the "frozen photoreactive polysaccharide solution" obtained in the step (A) is irradiated with light to crosslink the photoreactive polysaccharide, thereby obtaining a polysaccharide sponge. The kind of light irradiated may be selected according to the kind of photoreactive substance used. For example, when cinnamic acid is used as the photo-crosslinking group, ultraviolet light may be used as the irradiated light. In this case, the wavelength of the ultraviolet light is preferably selected from the range of 100 to 400 nm.

Also, the light irradiation time may be appropriately varied according to an output power of the light source and aimed applications of the photo-crosslinked polysaccharide. For example, when cinnamic acid is used as the photo-crosslinking group and when 10 ml of the photoreactive polysaccharide solution is irradiated by one 400 W high-pressure mercury lamp to produce a crosslinked polysaccharide sponge, the light irradiation is performed as follows. That is, in order to obtain a polysaccharide sponge having a relatively high mechanical strength (usually not less than 350 g when using a 4-wt. % photoreactive polysaccharide solution and not less than 100 g when using a 2-wt. % photoreactive polysaccharide solution as measured by the method defined in the below-mentioned Examples), the polysaccharide solution is placed 4 cm apart from the light source, and irradiated with light at an intensity of 10.9 to 11.3 $mW/cm^2$ (calculated as 280 nm ultraviolet light) for a period of from 30 seconds to 7 minutes. In the case where the solution is irradiated with light for a longer period, it is possible to obtain a polysaccharide sponge having a still higher hardness. In addition, even though the irradiation time is the same, when the light source with a lower output and the longer distance from the light source are used, it becomes possible to obtain a polysaccharide sponge having a lower crosslinking degree and, therefore, a more excellent biodegradability.

For example, in the case where a 4% hyaluronic acid solution into which cinnamic acid is introduced, is irradiated by the above 400 W high-pressure mercury lamp placed 4 cm apart from the solution, the relationship between the introduction percentage of the photoreactive crosslinking group, the irradiation time and the crosslinking percentage is shown in FIG. 1. Meanwhile, the photo-crosslinked hyaluronic acid having the above-described crosslinking percentage generally has the following properties as shown in Table 1 below.

TABLE 1

| Cross linking percentage (%) | Properties |
| --- | --- |
| 2.7 | Translucent, fingerprint-like patterns were recognized; more brittle |
| 6.4 | Whitened as a whole, and readily broken though spongy structure was still maintained |
| 8.9 | White sponge having such a strength as to be bendable by hand |
| 10.3 | White sponge having such a strength as not to be breakable upon rubbing by fingers |
| 18.6 | White sponge having such a strength as not to be tearable and breakable by fingers |

The above-described polysaccharide sponge having a relatively high mechanical strength is a polysaccharide sponge having a crosslinking percentage of not less than 7%, preferably not less than 8%, more preferably 10 to 40%, though the crosslinking percentage varies depending upon molecular weight of the polysaccharide. Also, the polysaccharide sponge having a crosslinking percentage of about 1 to 5% exhibits an excellent biodegradability, and the crosslinking percentage of the biodegradable polysaccharide sponge is more preferably 1 to 3%. Meanwhile, the crosslinking percentage means the value expressed by percentage showing a proportion of the number of molecules of crosslinked photo-crosslinking groups based on number of molecules of photo-crosslinking groups bonded to one molecule of the polysaccharide.

3. Production Process (2)

In the step (C), the photoreactive polysaccharide solution is frozen and freeze-dried by an ordinary method. The procedure of the step (C) up to freezing the photoreactive polysaccharide solution is identical to that of the step (A) in the production process (1).

(1) Step (C)

The freeze-drying treatment of the step (C) is not particularly restricted as long as the "frozen photoreactive polysaccharide solution" is treated to remove the solvent therefrom while keeping its frozen state. The frozen photoreactive polysaccharide solution may be placed under reduced pressure while cooling to sublimate the solvent therefrom. Alternatively, the frozen photoreactive polysaccharide solution may be exposed to rapidly reduced pressure at ordinary temperature to sublimate the solvent therefrom. When subjecting the solution to such a treatment, voids are generated at its portions from which the solvent is removed, upon freezing, so that the obtained polysaccharide sponge can be provided with pores having a desired pore diameter. By conducting the step (C), it is possible to obtain a photoreactive polysaccharide sponge made of the photoreactive polysaccharide. The thus obtained photoreactive polysaccharide sponge has not less than 30 pores, preferably not less than 40 pores per an unit area of 160×246 μm, and not less than 50%, preferably not less than 60%, more preferably not less than 70% of the pores have a pore diameter of 10 to 50 μm. The photoreactive polysaccharide sponge is easily soluble in spite of its good strength as described in Examples below and, therefore, can be used in the applications requiring such properties.

(2) Step (D)

In the step (D), the "freeze-dried product of the photoreactive polysaccharide solution" obtained in the step (C) is irradiated with light to crosslink the photoreactive polysaccharide, thereby obtaining a polysaccharide sponge.

The kind of light irradiated is identical to that used in the step (B) of the production process (1).

The light irradiation time may be varied according to an output power of light source and aimed applications of the photo-crosslinked polysaccharide sponge produced. For example, when cinnamic acid is used as the photo-crosslinking group and when the freeze-dried product produced from 10 ml of the photoreactive polysaccharide solution is irradiated by one 400 W high-pressure mercury lamp to produce a polysaccharide sponge, the light irradiation is performed as follows. That is, in order to obtain a polysaccharide sponge having a relatively high mechanical strength, the freeze-dried product is placed 4 cm apart from the light source, and irradiated with light at an intensity of 10.9 to 11.3 mW/cm$^2$ (calculated as 280 nm ultraviolet light) for a period of from 25 seconds to 7 minutes. When the freeze-dried product is irradiated with light for a longer period, it is possible to obtain a polysaccharide sponge having a still higher hardness. In addition, even though the irradiation time is the same, when the light source with a lower output and the longer distance from the light source are used, it becomes possible to obtain a polysaccharide sponge having a lower crosslinking degree and, therefore, a more excellent biodegradability. As described in Example 4, the thus obtained polysaccharide sponge is substantially identical in shape retention property, water absorption property, pore diameter and its distribution, crosslinking percentage and isomerization percentage to those of the polysaccharide sponge produced in the production process (1).

When the photo-crosslinking group bonded to the polysaccharide is subjected to crosslinking reaction by irradiating light thereto according to the production process (1) or (2), the frozen photoreactive polysaccharide solution (frozen solution prepared in the step (A)) or the freeze-dried product of the photoreactive polysaccharide solution (freeze-dried product prepared in the step (C)) is formed into a sponge made of the photo-crosslinked polysaccharide while maintaining its shape. That is, since the polysaccharide sponge of the present invention is produced from the photoreactive polysaccharide in the form of a solution that can be easily purified, it is possible to readily obtain a sponge containing no impurities. In addition, the photo-crosslinking reaction of the frozen solution or freeze-dried product can be caused by a much less light energy as compared to that of a solution. Therefore, it is possible to readily obtain a sponge made of a crosslinked polysaccharide having a higher crosslinking percentage than that of the crosslinked polysaccharide obtained from the solution under the same light irradiating conditions. Further, in the case where the introduction percentage of the photo-crosslinking group is the same, the crosslinking percentage (degree of substitution) of the obtained polysaccharide sponge according to the present invention is much higher than that of conventional photo-crosslinked products. For example, even when being sterilized in an autoclave under more severe conditions, i.e., at 122° C. for 20 minutes in order to ensure a good sterilizability required for drugs or medical equipment, the polysaccharide sponge of the present invention can still maintain its spongy structure after conducting the autoclave sterilization.

BEST MODE FOR CARRYING OUT THE INVENTION

The present invention is described in more detail by the following Examples.

Example 1

1 g of photoreactive hyaluronic acid obtained by introducing aminopropyl cinnamate into 3% of whole carboxyl groups of hyaluronic acid (produced by Seikagaku Kogyo Corporation; weight-average molecular weight: 900,000) (introduction percentage: 3%) was dissolved in 25 ml of injection water to prepare a 4 wt. % photoreactive hyaluronic acid solution. The thus obtained aqueous solution was interposed between two hard (Pyrex) glass plates (produced by Asahi Technoglass Co., Ltd.) so as to form a layer of the solution with a thickness of 1 mm, and then rapidly frozen under an atmosphere of −80° C. While keeping the frozen state, the frozen solution was irradiated with light for 5 minutes using a high-pressure mercury lamp (400 W lamp manufactured by Shigemi Standard Co., Ltd.). After the irradiation, the obtained material was thawed at room temperature to obtain a white photo-crosslinked hyaluronic acid sponge.

As a result of visually observing the thus obtained photo-crosslinked hyaluronic acid sponge, it was confirmed that the sponge was a porous material. Further, since water absorbed in the sponge was readily squeezed out by fingers, and the water-free sponge readily absorbed water therein, it was confirmed that the above sponge had excellent water absorbing and discharging properties. When the sponge was immersed in injection water for 5 seconds, the weight thereof was increased to 6.1 g. Then, when the water-absorbed sponge was filtered through a filter paper to completely remove water therefrom, the weight thereof was reduced to 0.8 g. Further, when the sponge was immersed again in injection water for 5 seconds, the weight thereof was increased to 5.9 g, and the water content of the sponge was 86.9%. In addition, the photo-crosslinked hyaluronic acid sponge was placed in a plastic petri dish, and freeze-dried in vacuo at 20° C. under a pressure of 10 mmHg for 5 hours, thereby obtaining a dried photo-crosslinked hyaluronic acid sponge.

Figure 2:
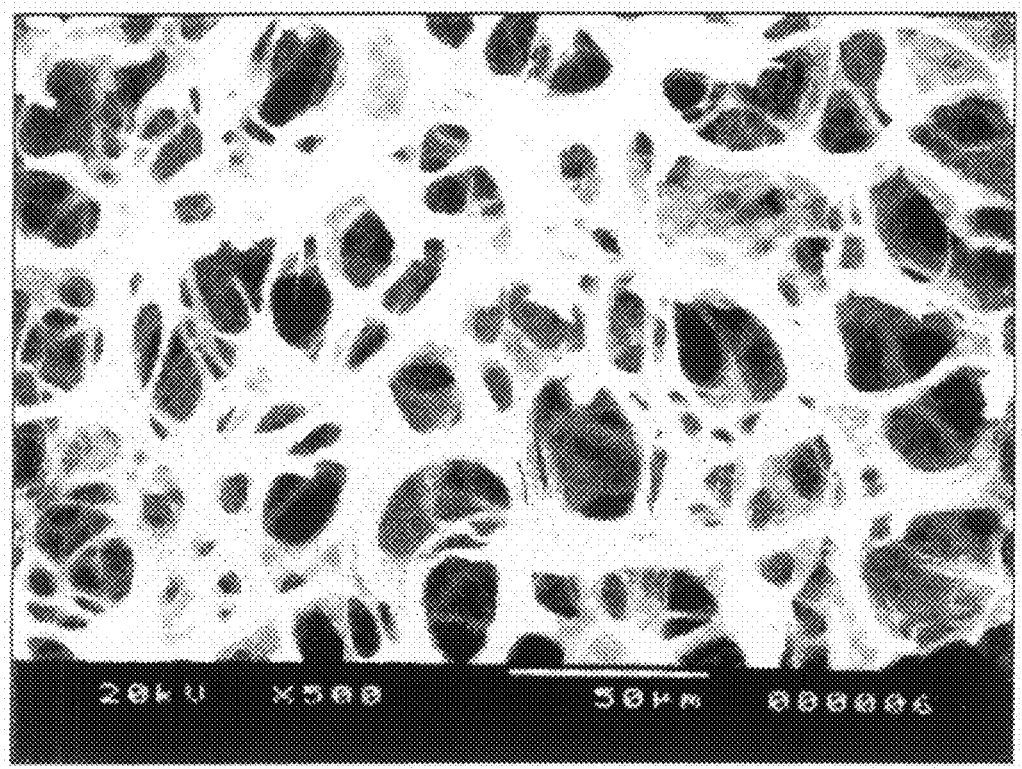
FIG. 2 is a scanning electron micrograph of a photo-crosslinked reactive hyaluronic acid sponge prepared in Example 1.

The section of the thus obtained dried photo-crosslinked hyaluronic acid sponge was observed by an electron microscope (scanning electron microscope "JSM-5200" manufactured by Nippon Denshi Co., Ltd.). As a result, it was confirmed that the sponge had 108 pores per a photographed area (160×246 μm=39,360 μm$^2$), and the 70 pores thereof (65%) had a pore diameter of 10 to 50 μm (FIG. 2).

Example 2

The frozen photoreactive hyaluronic acid solution produced by the same method as defined in Example 1 was irradiated with light for 7 minutes to obtain a photo-crosslinked hyaluronic acid sponge. The thus obtained photo-crosslinked hyaluronic acid sponge was a porous material and exhibited excellent water absorbing and discharging properties similarly to the sponge obtained in Example 1.

Figure 3:
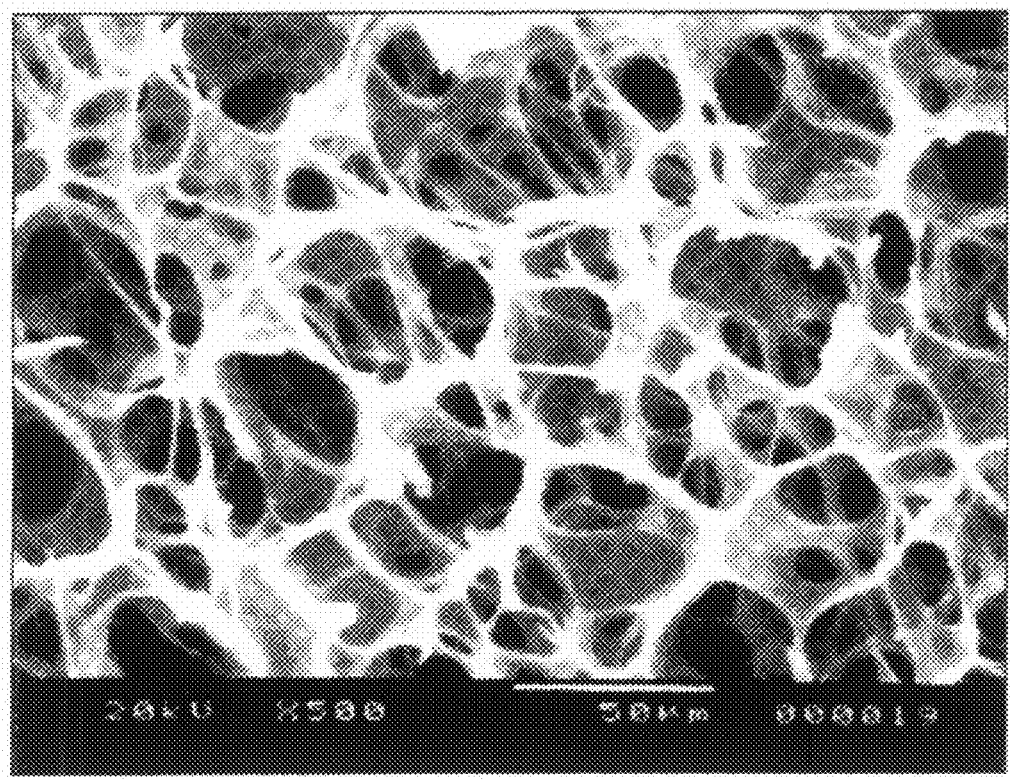
FIG. 3 is a scanning electron micrograph of a photo-crosslinked hyaluronic acid sponge prepared in Example 2.

The section of the thus obtained photo-crosslinked hyaluronic acid sponge was observed by an electron microscope (scanning electron microscope "JSM-5200"). As a result, it was confirmed that the sponge had 92 pores per a photographed area (160×246 μm=39,360 μm$^2$), and the 56 pores thereof (61%) had a pore diameter of 10 to 50 μm (FIG. 3).

Example 3

1 g of photoreactive hyaluronic acid obtained by introducing aminopropyl cinnamate into 3% of whole carboxyl groups of hyaluronic acid (produced by Seikagaku Kogyo Corporation; weight-average molecular weight: 900,000) (introduction percentage: 3%) was dissolved in 25 ml of injection water to prepare a 4 wt. % photoreactive hyaluronic acid solution. The thus obtained aqueous solution was interposed between two hard (Pyrex) glass plates (produced by Asahi Technoglass Co., Ltd.) so as to form a layer of the solution with a thickness of 1 mm. Then, the solution was rapidly frozen under an atmosphere of −80° C., and freeze-dried in vacuo at 20° C. under a pressure of 10 mmHg for 24 hours, thereby obtaining a photoreactive hyaluronic acid sponge (freeze-dried product). The thus obtained freeze-dried product was irradiated with light at ordinary temperature for 5 minutes using a high-pressure mercury lamp (400 W lamp manufactured by Shigemi Standard Co., Ltd.) to obtain a photo-crosslinked hyaluronic acid sponge.

As a result of visually observing the thus obtained photo-crosslinked hyaluronic acid sponge, it was confirmed that the sponge was a porous material, and showed an excellent water absorption property when immersed in distilled water. When the sponge was immersed in injection water for 5 seconds, the weight thereof was increased to 4.9 g. Then, when the water-absorbed sponge was removed water with a filter paper completely, the weight thereof was reduced to 0.7 g. Further, when the sponge was immersed again in injection water for 5 seconds, the weight thereof was increased to 4.6 g, and the water content of the sponge was 85.7%. Water absorbed in the photo-crosslinked hyaluronic acid sponge was easily squeezed out by fingers therefrom. This showed that the photo-crosslinked hyaluronic acid sponge had excellent water absorbing and discharging properties.

Figure 4:
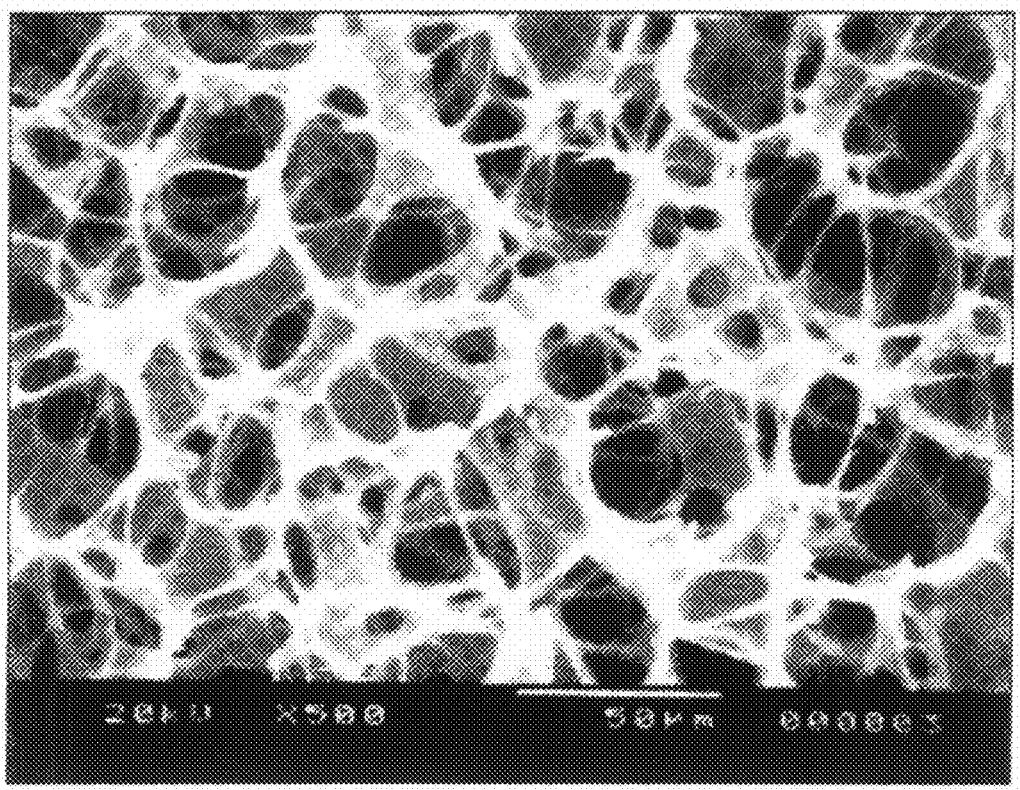
FIG. 4 is a scanning electron micrograph of a photo-crosslinked hyaluronic acid sponge prepared in Example 3.

The section of the thus obtained photo-crosslinked hyaluronic acid sponge was observed by an electron microscope (scanning electron microscope "JSM-5200"). As a result, it was confirmed that the sponge had 91 pores per a photographed area (160×246 μm=39,360 μm$^2$), and the 67 pores thereof (73%) had a pore diameter of 10 to 50 μm (FIG. 4).

Example 4

Figure 5:
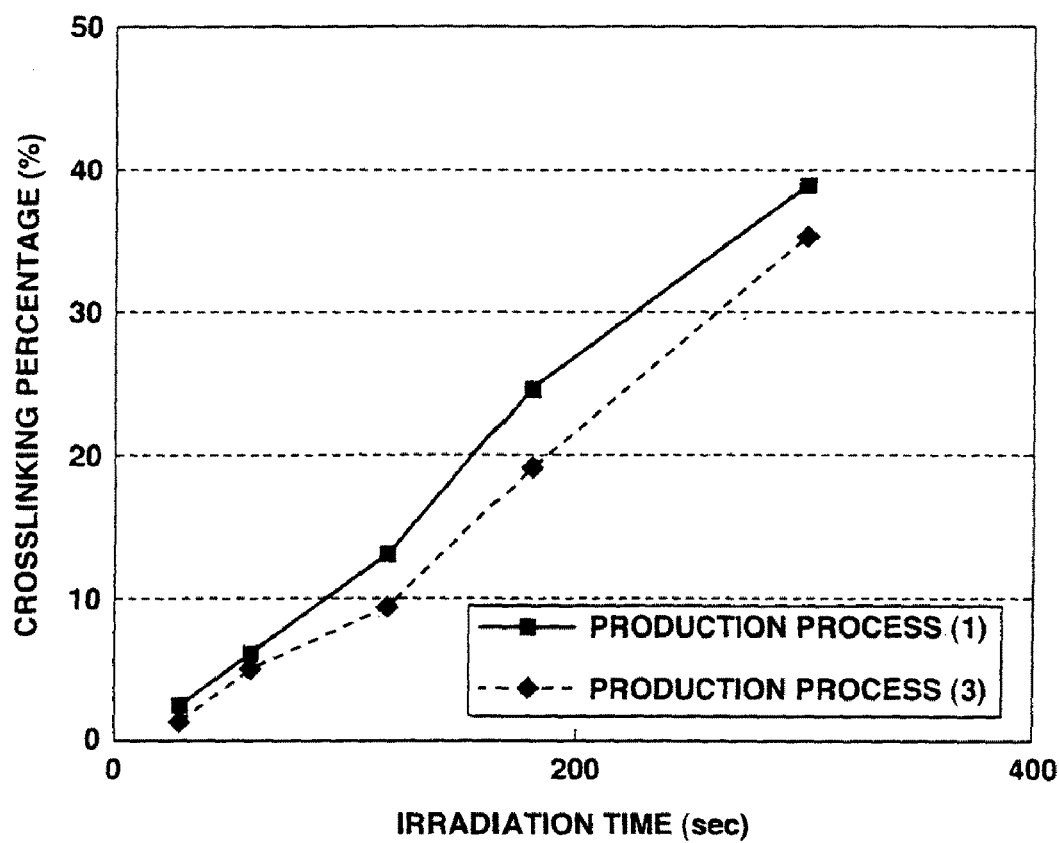
FIG. 5 is a graph showing a comparison between photo-crosslinked hyaluronic acid sponges prepared by the production method 1 and the production method 2 with respect to isomerization percentages thereof.
Figure 6:
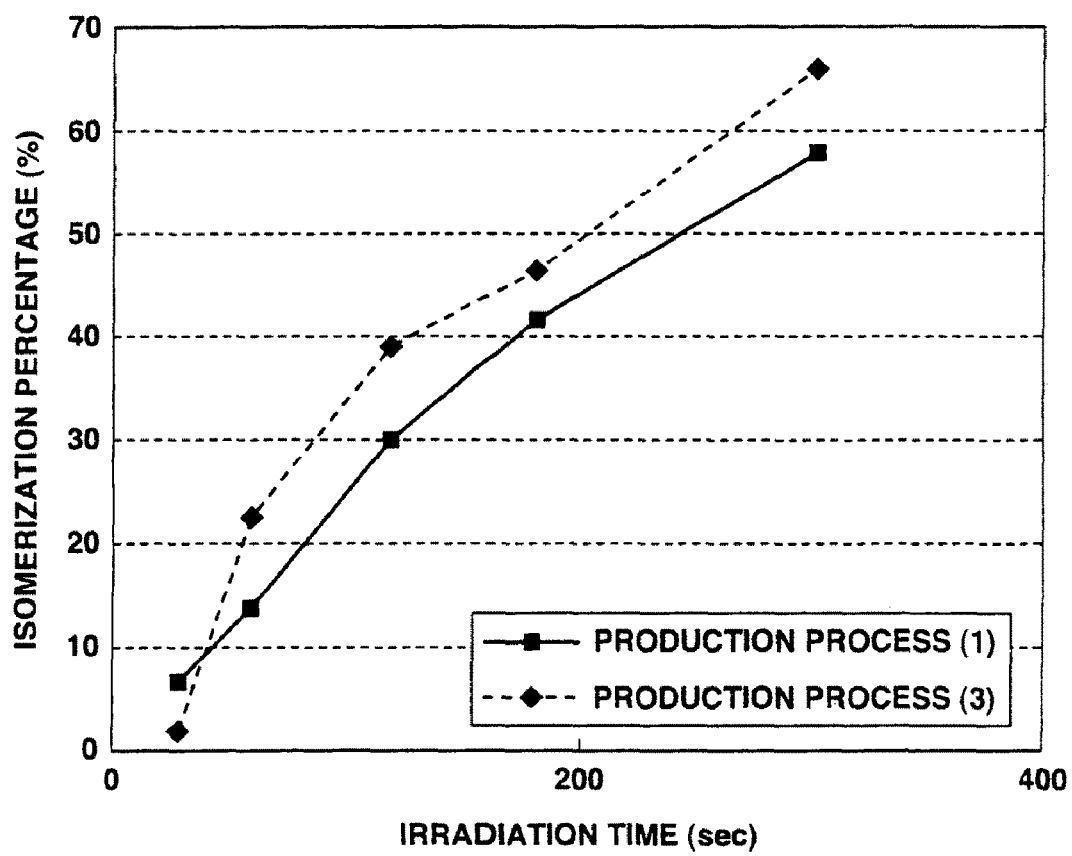
FIG. 6 is a graph showing a comparison between the photo-crosslinked hyaluronic acid sponges prepared by the production method 1 and the production method 2 with respect to crosslinking percentages thereof.

The crosslinking percentage and isomerization percentage of the photo-crosslinked hyaluronic acid sponge prepared in Example 1 (production process (1)) were compared with those of the photo-crosslinked hyaluronic acid sponge prepared in Example 3 (production process (2)) to evaluate an identity (equality) therebetween. The crosslinking percentage was measured as follows. That is, 1 g of the respective sponges was saponified with 1 ml of a 1M sodium hydroxide aqueous solution for one hour. Then, the obtained solution was acidified and treated with ethyl acetate to extract compounds (monomers and dimers) derived from the photo-crosslinking group therefrom. The thus extracted compounds were analyzed by high-speed liquid chromatography (HPLC) according to an ordinary method. Using the prepared calibration curve, the amount of the dimers contained in the above compounds was measured. Further, the percentage of moles of the photo-crosslinking group converted into the dimers to moles of the photo-crosslinking group introduced into the hyaluronic acid was calculated (FIG. 5). Also, the isomerization percentage means the value expressed by percentage showing a proportion of the amount of monomers as cis-isomers (observed as a separate peak from that of trans-isomers) to the amount of cinnamic acid monomer, as calculated from peaks of the respective monomers (FIG. 6). As a result of these measurements, it was confirmed that the crosslinking percentage and isomerization percentage of the photo-crosslinked hyaluronic acid sponge prepared in Example 1 were substantially identical to those of the photo-crosslinked hyaluronic acid sponge prepared in Example 3.

Example 5

1 ml of the same 4% photoreactive hyaluronic acid aqueous solution as prepared in Example 1 was filled and sealed in a high-density polypropylene pack, and then rapidly frozen under an atmosphere of −80° C. Then, while keeping the frozen state, the frozen solution was irradiated with light for 5 minutes using a high-pressure mercury lamp. Thereafter, the obtained product was sterilized in an autoclave at 122° C. for 20 minutes, thereby obtaining a sterilized photo-crosslinked hyaluronic acid sponge.

As a result of visually observing the thus obtained photo-crosslinked hyaluronic acid sponge, it was confirmed that the sponge was a porous material and still maintained its shape before the autoclave sterilization. In addition, since water absorbed therein was readily squeezed out by fingers, and the water-free sponge easily absorbed water therein, it was confirmed that the above sponge had excellent water absorbing and discharging properties. Further, the photo-crosslinked hyaluronic acid sponge was freeze-dried in vacuo by the same method as defined in Example 1, thereby obtaining a dried photo-crosslinked hyaluronic acid sponge.

Example 6

1 ml of the same 4% photoreactive hyaluronic acid aqueous solution as prepared in Example 1 was filled and sealed in a high-density polypropylene pack, and then slowly frozen in a general-purpose refrigerator maintained at −7° C. Then, while keeping the frozen state, the frozen solution was irradiated with light for 5 minutes using a high-pressure mercury lamp. Thereafter, the obtained product was sterilized in an autoclave at 122° C. for 20 minutes, thereby obtaining a sterilized photo-crosslinked hyaluronic acid sponge.

As a result of visually observing the thus obtained sterilized photo-crosslinked hyaluronic acid sponge, it was confirmed that the sponge was a porous material. In addition, since water absorbed therein was readily squeezed out by fingers and the water-free sponge easily absorbed water therein, it was confirmed that the above sponge had excellent water absorbing and discharging properties. Further, the sterilized photo-crosslinked hyaluronic acid sponge was placed in a plastic petri dish, slowly frozen in a general-purpose refrigerator maintained at −7° C., and then freeze-dried in vacuo under a pressure of 10 mmHg for 5 hours, thereby obtaining a dried photo-crosslinked hyaluronic acid sponge.

When the thus obtained dried photo-crosslinked hyaluronic acid sponge was immersed again in water, water absorbed therein was easily squeezed out by fingers, and the water-free sponge easily absorbed water therein. Therefore, it was confirmed that the above sponge had excellent water absorbing and discharging properties. Also, the mechanical properties of the sponge were not changed between before and after the freeze-drying treatment.

Example 7

1 g of a hyaluronic acid derivative obtained by introducing aminopropyl furyl acrylate into 4% of whole carboxyl groups of hyaluronic acid was dissolved in 25 ml of injection water to prepare a 4 wt. % photoreactive hyaluronic acid aqueous solution. The thus obtained aqueous solution was filled and sealed in a high-density polypropylene pack so as to form a layer of the solution with a thickness of 1 mm, and then rapidly frozen under an atmosphere of −80° C. Then, while keeping the frozen state, the frozen solution was irradiated with light for 5 minutes using a high-pressure mercury lamp. Thereafter, the obtained product was sterilized in an autoclave at 122° C. for 20 minutes, thereby obtaining a sterilized photo-crosslinked hyaluronic acid sponge.

As a result of visually observing the thus obtained sterilized photo-crosslinked hyaluronic acid sponge, it was confirmed that the sponge was a porous material. In addition, since water absorbed therein was readily squeezed out by fingers and the water-free sponge easily absorbed water therein, it was confirmed that the above sponge had excellent water absorbing and discharging properties. Further, the sterilized photo-crosslinked hyaluronic acid sponge was placed in a plastic petri dish, and then freeze-dried in vacuo at 20° C. under a pressure of 10 mmHg for 5 hours, thereby obtaining a dried photo-crosslinked hyaluronic acid sponge.

Meanwhile, the above hyaluronic acid into which the aminopropyl furyl acrylate was introduced, was prepared as follows. That is, 1 g of hyaluronic acid was dissolved in 100 ml of injection water and 50 ml of 1,4-dioxane, and the resultant solution was stirred at room temperature for 30 minutes. Then, 0.3 equivalent 1-ethyl-3-(3-dimethylaminopropyl)carboximide hydrochloride, 1-hydroxysuccinimide and aminopropyl furyl acrylate were successively added to the resultant solution. The resultant mixture was stirred for 2 hours, and then mixed with 1 g of NaCl, and further poured into 500 ml of ethanol to form a precipitate. Thereafter, the thus obtained precipitate was washed with ethanol three times, and centrifuged to obtain the precipitate. The obtained precipitate was dried at 40° C. under reduced pressure over one night, thereby producing about 1 g of the hyaluronic acid into which the aminopropyl furyl acrylate was introduced.

Example 8

1 g of a hyaluronic acid derivative obtained by introducing aminopropyl thiophene acrylate into 4% of whole carboxyl groups of hyaluronic acid, was dissolved in 25 ml of injection water to prepare a 4 wt. % hyaluronic acid derivative aqueous solution. The thus obtained aqueous solution was filled and sealed in a high-density polypropylene pack so as to form a layer of the solution with a thickness of 1 mm, and then rapidly frozen under an atmosphere of −80° C. Then, while keeping the frozen state, the frozen solution was irradiated with light for 5 minutes using a high-pressure mercury lamp. Thereafter, the obtained product was sterilized in an autoclave at 122° C. for 20 minutes, thereby obtaining a sterilized photo-crosslinked hyaluronic acid sponge.

As a result of visually observing the thus obtained sterilized photo-crosslinked hyaluronic acid sponge, it was confirmed that the sponge was a porous material. In addition, since water absorbed in the sponge was readily squeezed out by fingers and the water-free sponge easily absorbed water therein, it was confirmed that the above sponge had excellent water absorbing and discharging properties. Further, the sterilized photo-crosslinked hyaluronic acid sponge was placed in a plastic petri dish, and then freeze-dried in vacuo at 20° C. under a pressure of 10 mmHg for 5 hours, thereby obtaining a dried photo-crosslinked hyaluronic acid sponge.

Meanwhile, the above hyaluronic acid derivative into which the aminopropyl thiophene acrylate was introduced was prepared as follows. That is, 1 g of hyaluronic acid was dissolved in 100 ml of injection water and 50 ml of 1,4-dioxane, and the resultant solution was stirred at room temperature for 30 minutes. Then, 0.3 equivalent 1-ethyl-3-(3-dimethylaminopropyl)carboximide hydrochloride, 1-hydroxysuccinimide and aminopropyl thiophene acrylate were successively added to the resultant solution. The resultant mixture was stirred for 2 hours, and then mixed with 1 g of NaCl, and further poured into 500 ml of ethanol to form a precipitate. Thereafter, the thus obtained precipitate was washed with ethanol three times, and centrifuged to recover the precipitate. The recovered precipitate was dried at 40° C. under reduced pressure over one night, thereby producing about 1 g of the hyaluronic acid into which the aminopropyl thiophene acrylate was introduced.

Example 9

1 g of a photoreactive alginic acid obtained by introducing aminopropyl cinnamate into 3% of whole carboxyl groups of sodium alginate (produced by Wako Junyaku Kogyo Co., Ltd.; weight-average molecular weight: 40,000) was dissolved in 25 ml of injection water to prepare a 4 wt. % photoreactive alginic acid aqueous solution. The thus obtained aqueous solution was filled and sealed in a high-density polypropylene pack so as to form a layer of the solution with a thickness of 1 mm, and then rapidly frozen under an atmosphere of −80° C. Then, while keeping the frozen state, the frozen solution was irradiated with light for 2 minutes using a high-pressure mercury lamp, thereby obtaining a photo-crosslinked alginic acid sponge.

As a result of visually observing the thus obtained photo-crosslinked alginic acid sponge, it was confirmed that the sponge was a porous material. In addition, since water absorbed in the sponge was readily squeezed out by fingers, and the water-free sponge easily absorbed water therein, it was confirmed that the above sponge had excellent water absorbing and discharging properties. Further, the photo-crosslinked alginic acid sponge was placed in a plastic petri dish, and then freeze-dried in vacuo at 20° C. under a pressure of 10 mmHg for 5 hours, thereby obtaining a dried photo-crosslinked alginic acid sponge.

Meanwhile, the above alginic acid into which the aminopropyl cinnamate was introduced was prepared as follows. That is, 1 g of alginic acid (viscosity: 50 to 100 cp) was dissolved in 100 ml of injection water and 50 ml of 1,4-dioxane, and the resultant solution was stirred at room temperature for 30 minutes. Then, 0.3 equivalent 1-ethyl-3-(3-dimethylaminopropyl)carboximide hydrochloride, 1-hydroxysuccinimide and aminopropyl cinnamate were successively added to the resultant solution. The resultant mixture was stirred for 2 hours, and then mixed with 1 g of NaCl and further poured into 500 ml of ethanol to form a precipitate. Thereafter, the thus obtained precipitate was washed with ethanol three times, and centrifuged to recover the precipitate. The recovered precipitate was dried at 40° C. under reduced pressure over one night, thereby producing about 1 g of the alginic acid into which the aminopropyl cinnamate was introduced.

Example 10

1 g of a photoreactive carboxymethyl cellulose obtained by introducing aminopropyl cinnamate into 3% of residual carboxyl groups of carboxymethyl cellulose (produced by Nakarai Tesque Co., Ltd.; weight-average molecular weight: 180,000) was dissolved in 25 ml of injection water to prepare a 4 wt. % photoreactive carboxymethyl cellulose aqueous solution. The thus obtained aqueous solution was filled and sealed in a high-density polypropylene pack so as to form a layer of the solution with a thickness of 1 mm, and then rapidly frozen under an atmosphere of −80° C. Then, while keeping the frozen state, the frozen solution was irradiated with light for 5 minutes using a high-pressure mercury lamp. Thereafter, the obtained product was sterilized in an autoclave at 122° C. for 20 minutes, thereby obtaining a sterilized photo-crosslinked carboxymethyl cellulose sponge.

As a result of visually observing the thus obtained sterilized photo-crosslinked carboxymethyl cellulose sponge, it was confirmed that the sponge was a porous material. In addition, since water absorbed in the sponge was readily squeezed out by fingers, and the water-free sponge easily absorbed water therein, it was confirmed that the above sponge had excellent water absorbing and discharging properties. Further, the photo-crosslinked carboxymethyl cellulose sponge was placed in a plastic petri dish, and then freeze-dried in vacuo at 20° C. under a pressure of 10 mmHg for 5 hours, thereby obtaining a dried photo-crosslinked carboxymethyl cellulose sponge.

Meanwhile, the above carboxymethyl cellulose into which the aminopropyl cinnamate was introduced was prepared as follows. That is, 1 g of carboxymethyl cellulose (average molecular weight: 180,000) was dissolved in 100 ml of injection water and 50 ml of 1,4-dioxane, and the resultant solution was stirred at room temperature for 30 minutes. Then, 0.3 equivalent 1-ethyl-3-(3-dimethylaminopropyl)carboximide hydrochloride, 1-hydroxysuccinimide and aminopropyl cinnamate in adequate amounts based on the residual carboxyl groups of the carboxymethyl cellulose whose substitution percentage was regarded as being 30%, were successively added to the resultant solution. The resultant mixture was stirred for 2 hours, and then mixed with 1 g of NaCl, and further poured into 500 ml of ethanol to form a precipitate. Thereafter, the thus obtained precipitate was washed with ethanol three times, and centrifuged to recover the precipitate. The recovered precipitate was dried at 40° C. under reduced pressure over one night, thereby producing about 1 g of the carboxymethyl cellulose into which the aminopropyl cinnamate was introduced.

Example 11

1 g of a photoreactive chondroitin sulfuric acid obtained by introducing aminopropyl cinnamate into 2% of whole carboxyl groups of chondroitin sulfate C (produced by Seikagaku Kogyo Corporation; weight-average molecular weight: 60,000) was dissolved in 12.5 ml of injection water to prepare a 8 wt. % photoreactive chondroitin sulfuric acid derivative aqueous solution. The thus obtained aqueous solution was filled and sealed in a high-density polypropylene pack so as to form a layer of the solution with a thickness of 1 mm, and then rapidly frozen under an atmosphere of −80° C. Then, while keeping the frozen state, the frozen solution was irradiated with light for 15 minutes using a high-pressure mercury lamp, thereby obtaining a photo-crosslinked chondroitin sulfate sponge.

As a result of visually observing the thus obtained photo-crosslinked chondroitin sulfate sponge, it was confirmed that the sponge was a porous material. In addition, since water absorbed in the sponge was readily squeezed out by fingers, and the water-free sponge easily absorbed water therein, it was confirmed that the above sponge had excellent water absorbing and discharging properties. Further, the photo-crosslinked chondroitin sulfate sponge was placed in a plastic petri dish, and then freeze-dried in vacuo at 20° C. under a pressure of 10 mmHg for 5 hours, thereby obtaining a dried photo-crosslinked chondroitin sulfate sponge.

Meanwhile, the above chondroitin sulfate into which the aminopropyl cinnamate was introduced was prepared as follows. That is, 1 g of chondroitin sulfuric acid (average molecular weight: 60,000) was dissolved in 100 ml of injection water and 50 ml of 1,4-dioxane, and the resultant solution was stirred at room temperature for 30 minutes. Then, 0.3 equivalent 1-ethyl-3-(3-dimethylaminopropyl)carboximide hydrochloride, 1-hydroxysuccinimide and aminopropyl cinnamate were successively added to the resultant solution. The resultant mixture was stirred for 2 hours, and then mixed with 1 g of NaCl, and further poured into 500 ml of ethanol to form a precipitate. Thereafter, the thus obtained precipitate was washed with ethanol three times, and centrifuged to recover the precipitate. The recovered precipitate was dried at 40° C. under reduced pressure over one night, thereby producing about 1 g of the chondroitin sulfate into which the aminopropyl cinnamate was introduced.

Example 12

The photo-crosslinked hyaluronic acid sponges obtained in Examples 1 and 2 were compared with a freeze-dried product of a hyaluronic acid aqueous solution and the photoreactive hyaluronic acid sponge prepared in Example 3 to evaluate a shape retention property thereof when immersed in distilled water.

That is, a freeze-dried product of a 4 wt. % hyaluronic acid aqueous solution (i.e., hyaluronic acid sponge obtained by freeze-drying the solution under 10 mmHg for 24 hours), the photo-crosslinked hyaluronic acid sponges obtained in Examples 1 and 2, and the photoreactive hyaluronic acid sponge (non-crosslinked state) prepared in Example 3, were respectively formed so as to have a thickness of 1 mm. The respective samples were cut into a strip of 1×2 cm, and immersed in 5 ml of distilled water at 24° C. to observe the conditions upon the immersion as well as after the elapse of one hour, 3 hours and 48 hours from initiation of the immersion. As a result, the hyaluronic acid sponge and the photoreactive hyaluronic acid sponge underwent dissolution immediately after immersed in distilled water. More specifically, the hyaluronic acid sponge and the photoreactive hyaluronic acid sponge were broken in shape after one hour and formed into gelled masses. Further, these sponges were still kept in the gelled state after 3 hours, but completely dissolved to form a uniform solution after 48 hours. On the other hand, the photo-crosslinked hyaluronic acid sponges of Examples 1 and 2 underwent no change upon the immersion except for increased thickness due to water absorbed therein, and maintained a constant shape after one hour, 3 hours and even 48 hours.

In addition, a hyaluronic acid sponge was prepared from a 2 wt. % hyaluronic acid aqueous solution, and photo-crosslinked hyaluronic acid sponges and a photoreactive hyaluronic acid sponge were respectively prepared from a 2 wt. % photoreactive hyaluronic acid aqueous solution by the same method as defined in each of Examples 1, 2 and 3. These sponges were formed into a thickness of 1 mm, and subjected to the same distilled water immersion test as defined above. As a result, the photo-crosslinked hyaluronic acid sponges underwent no change upon the immersion test except for increased thickness due to water absorbed therein, and maintained a constant shape after one hour, 3 hours and even 48 hours. Accordingly, it was recognized that as long as the sponges had a cross-linked structure, they exhibited a good shape retention property in water irrespective of the concentration of the photoreactive hyaluronic acid used.

Further, the respective sponges were tested by a texture analyzer ("TA-XT2" manufactured by Stable Systems Inc.) to measure and compare breaking strengths thereof. The breaking strength was determined by measuring a maximum stress caused when a spherical probe having a diameter of 12.5 mm was pressed against the fixed sample at a velocity of 1 mm/sec (Table 2). As a result, it was confirmed that the photoreactive hyaluronic acid sponge and the photo-crosslinked hyaluronic acid sponges were improved in strength as compared to the hyaluronic acid sponge, and further it was confirmed that the photo-crosslinked hyaluronic acid sponges obtained in Examples 1 and 2 were substantially identical in breaking strength to that of the photoreactive hyaluronic acid sponge which was different in light irradiation time from the photo-crosslinked hyaluronic acid sponges. This showed that the breaking strength of the sponges was not remarkably influenced by existence or absence, and amount of the crosslinked structure, and sponges prepared from hyaluronic acid into which the photo-crosslinking group was introduced exhibited a higher strength than that prepared from simple hyaluronic acid containing no photo-crosslinking group.

TABLE 2

|  | Breaking strength (g) | Breaking strength (prepared from 2 wt. % hyaluronic acid solution) (g) |
|---|---|---|
| Hyaluronic acid sponge | 310.80 | 86.83 |
| Photoreactive hyaluronic acid sponge (prepared in Example 3) | 447.65 | 207.10 |
| Photo-crosslinked hyaluronic acid sponge (Example 1) | 559.30 | 191.60 |
| Photo-crosslinked hyaluronic acid sponge (Example 2) | 431.90 | 210.15 |

INDUSTRIAL APPLICABILITY

As described above, according of the present invention, there is provided a polysaccharide sponge produced by such a simplified process capable of easily removing impurities therefrom and requiring no removal step for a solvent, from which impurities are removed to such an extent that the sponge is applicable to medical equipment or the like.

What is claimed is:

1. A process for producing a polysaccharide sponge consisting of a crosslinked polysaccharide obtained by crosslinking a photoreactive polysaccharide, and having the following properties (1), (2) and (3) wherein said photoreactive polysaccharide is hyaluronic acid to which a photo-crosslinking group having cinnamic acid, aminocinnamic acid, furyl acrylic acid or thiophene acrylic acid as a photoreactive residue, is bonded
   (1) not less than 760 pores per unit area (1 mm$^2$) among which not less than 50% of said pores have a pore diameter of 10 to 50 μm
   (2) a water content, calculated from the following formula, is not less than 70%

$\{(Ww-Wd)/Ww\} \times 100$ wherein Ww is a weight of the sponge when immersed in an injection water for five seconds, and Wd is a weight of the sponge after completely removing water from the water-immersed sponge using a filter paper and
   (3) a breaking strength of a polysaccharide sponge, which is prepared from 2 weight % hyaluronic acid solution, is not less than 191.6 g as measured a maximum stress caused when a spherical probe having a diameter of 12.5 mm was pressed against the fixed sponge at a velocity of 1 mm/second by a texture analyzer,
   the process comprising the steps of
   (A) freezing the photoreactive polysaccharide solution; and
   (B) irradiating the frozen photoreactive polysaccharide solution with light to crosslink the photoreactive polysaccharide, thereby obtaining the polysaccharide sponge.

2. A process for producing a polysaccharide sponge comprising the steps of:
   (A) freezing a photoreactive polysaccharide solution, wherein said photoreactive polysaccharide is a polysaccharide selected from the group consisting of hyaluronic acid, chondroitin sulfate, heparin, heparin sulfate, keratan sulfate, chitin, chitosan, alginic acid and carboxymethyl cellulose to which a photo-crosslinking group having cinnamic acid, substituted cinnamic acid, furyl acrylic acid or thiophene acrylic acid as a photoreactive residue, is bonded; and
   (B) irradiating the frozen photoreactive polysaccharide solution with light to crosslink the photoreactive polysaccharide, thereby obtaining the polysaccharide sponge.

* * * * *